United States Patent
Bianchi et al.

(10) Patent No.: US 9,763,427 B2
(45) Date of Patent: Sep. 19, 2017

(54) MOBILE TELEPHONE DOG TRAINING TOOL AND METHOD

(71) Applicant: EB Partners, Austin, TX (US)

(72) Inventors: James C. Bianchi, Karnes City, TX (US); Robert W. Holland, Austin, TX (US)

(73) Assignee: Specifi-Kali, LLC, Austin, TX (US)

( * ) Notice: Subject to any disclaimer, the term of this patent is extended or adjusted under 35 U.S.C. 154(b) by 446 days.

(21) Appl. No.: 14/486,178

(22) Filed: Sep. 15, 2014

(65) Prior Publication Data

US 2015/0000612 A1 Jan. 1, 2015

Related U.S. Application Data

(63) Continuation of application No. 13/901,934, filed on May 24, 2013, now Pat. No. 8,839,744, which is a continuation-in-part of application No. 13/790,548, filed on Mar. 8, 2013, now Pat. No. 9,226,479.

(51) Int. Cl.
*A01K 15/02* (2006.01)
*G08B 23/00* (2006.01)

(52) U.S. Cl.
CPC ............ *A01K 15/021* (2013.01); *G08B 23/00* (2013.01)

(58) Field of Classification Search
CPC .. A01K 15/023; A01K 15/021; A01K 11/008; A01K 15/02; G08B 21/0277; G08B 21/0283
USPC .............. 119/720, 721, 712, 719; 340/573.1, 340/573.2, 573.3
See application file for complete search history.

(56) References Cited

U.S. PATENT DOCUMENTS

| 6,067,018 A * | 5/2000 | Skelton ................ A01K 11/008 119/721 |
| 6,232,880 B1 * | 5/2001 | Anderson ............ A01K 15/023 119/421 |
| 6,271,757 B1 * | 8/2001 | Touchton ............... A01K 15/02 119/721 |
| 6,310,553 B1 * | 10/2001 | Dance .................. A01K 11/008 119/718 |
| 6,437,727 B2 * | 8/2002 | Lemelson ............... G01S 19/18 342/45 |

(Continued)

OTHER PUBLICATIONS

Astro Comm. ID and Alpha Channel Mapping Charts, 2012.
Garmin, Frequently Asked Question, Sep. 1, 2015.
Gundogsupply.Com, Better: More ID Codes, 2012.

*Primary Examiner* — Yvonne Abbott-Lewis
(74) *Attorney, Agent, or Firm* — Terrile, Cannatti, Chambers & Holland, LLP; Robert W. Holland

(57) ABSTRACT

A mobile telephone adapts to use as a gundog training tool by interfacing with a dog collar using a wireless communication device, such as a WWAN text or IP interface, a WLAN interface or a radio transceiver that couples to the mobile telephone and is accessible to a training application running on the mobile telephone. The dog collar includes a GPS receiver to provide position information to the mobile telephone and a shock device to provide training stimulus to the dog. A wireless headset interfaces with the mobile telephone to provide audible indications of position to an end user, such as a dog point and tone indicators of directions to the dog. A wireless handset interfaces with the mobile telephone to accept inputs for application to the collar, such as training stimulus.

19 Claims, 7 Drawing Sheets

(56) References Cited

U.S. PATENT DOCUMENTS

| | | | |
|---|---|---|---|
| 6,441,778 B1* | 8/2002 | Durst | G01S 5/0027 |
| | | | 119/720 |
| 6,581,546 B1* | 6/2003 | Dalland | A01K 15/023 |
| | | | 119/712 |
| 6,700,492 B2 | 3/2004 | Touchton et al. | |
| 6,720,879 B2* | 4/2004 | Edwards | A01K 15/021 |
| | | | 340/12.51 |
| 7,034,695 B2* | 4/2006 | Troxler | A01K 15/023 |
| | | | 340/539.11 |
| 7,409,924 B2* | 8/2008 | Kates | A01K 15/02 |
| | | | 119/719 |
| 7,486,181 B2* | 2/2009 | Olsen | B60R 25/1004 |
| | | | 340/505 |
| 7,602,302 B2 | 10/2009 | Hokuf et al. | |
| 7,634,975 B2* | 12/2009 | Kates | A01K 15/02 |
| | | | 119/712 |
| 7,861,676 B2 | 1/2011 | Kates | |
| 7,864,057 B2* | 1/2011 | Milnes | A01K 15/023 |
| | | | 119/721 |
| 8,006,649 B2 | 8/2011 | Stapelfeld et al. | |
| 8,126,410 B2* | 2/2012 | Alon | H01Q 9/0442 |
| | | | 343/702 |
| 8,188,869 B2* | 5/2012 | Wangrud | A01K 11/008 |
| | | | 340/539.13 |
| 8,438,999 B2* | 5/2013 | Hardi | A01K 15/021 |
| | | | 119/718 |
| 8,457,595 B2* | 6/2013 | MacInnis | A61B 5/0024 |
| | | | 382/115 |
| 8,543,134 B2* | 9/2013 | Lopez | A01K 15/021 |
| | | | 455/411 |
| 8,723,733 B2* | 5/2014 | Tran | H01Q 1/085 |
| | | | 343/700 MS |
| 2004/0194714 A1* | 10/2004 | Lee | A01K 5/0114 |
| | | | 119/54 |
| 2005/0000468 A1* | 1/2005 | Giunta | A01K 15/023 |
| | | | 119/721 |
| 2005/0066912 A1* | 3/2005 | Korbitz | A01K 15/023 |
| | | | 119/721 |
| 2005/0257752 A1* | 11/2005 | Langer | A01K 27/009 |
| | | | 119/712 |
| 2007/0204804 A1* | 9/2007 | Swanson | A01K 15/023 |
| | | | 119/721 |
| 2008/0036610 A1* | 2/2008 | Hokuf | A01K 11/008 |
| | | | 340/573.3 |
| 2008/0159079 A1* | 7/2008 | Dir | A01K 97/125 |
| | | | 367/139 |
| 2009/0071413 A1* | 3/2009 | Stapelfeld | A01K 15/023 |
| | | | 119/712 |
| 2010/0045463 A1* | 2/2010 | Bradley | A01K 11/008 |
| | | | 340/573.1 |
| 2012/0204811 A1* | 8/2012 | Ryan | A01K 15/021 |
| | | | 119/720 |
| 2013/0157628 A1 | 6/2013 | Kim et al. | |

* cited by examiner

MOBILE TELEPHONE DOG TRAINING TOOL AND METHOD

RELATED PATENT APPLICATION

This application is a continuation-in-part of co-pending U.S. patent application Ser. No. 13/790,548, filed on Mar. 8, 2013 and entitled "MOBILE TELEPHONE DOG TRAINING TOOL AND METHOD," by inventors James C. Bianchi and Robert W. Holland, describes exemplary methods and systems and is incorporated by reference in its entirety.

BACKGROUND OF THE INVENTION

Field of the Invention

The present invention relates in general to the field of dog training, and more particularly to a mobile telephone dog training tool and method.

Description of the Related Art

Kali Bianchi recently completed an upland game bird grand slam. Kali is a French Brittany, *L'Epagneul Breton*. Her story is captured in "It's all about the Dog," published in the *Publication of the Club de l'Epagneul Breton of the United States*, Second Semester 2012, Issue 35. Kali never had formal training to speak of. Kali, like most successful gun dogs, had good genetic cloth woven into a hardy hunting companion by her love of her master.

Although Kali lacks formal training credentials, she did learn some basic skills the hard way at the old-fashioned South Texas school of hard knocks. She learned to listen when told to come or she would get chased down. She learned to avoid rattlesnakes after getting whacked on the nose by a de-fanged rattler. She learned that skunks stink and that dogs that smell like skunk do not get love. She learned that when the boots and gun came out, she better pick up and go because good things usually happen. Kali learned where birds hide with time and freedom on her hunts to investigate promising cover. When the cover was taller than her short stature, a bell around her neck and swishing weeds generally indicated her whereabouts. During the excitement of a hunt, the absence of noise meant a point and Kali had learned to find her quarry.

Kali grew up on a South Texas ranch with lots of room to roam and learn about the outdoors. Many gun dog pups do not share Kali's good fortune. City dogs that do not get to experience the outdoors as Kali did often have difficulty adapting to hunting unless they receive some sort of formal training. Professional kennel trainers who train many dogs simply do not have time for old-fashioned, hands-off training like that Kali received. If, for example, a professional kennel trainer had to chase down every pup that failed to come when called, not much training would get done. Instead, professionals typically use training tools that help teach dogs what to do and what not to do.

One prominent dog training tool is the shock collar, which applies an electric shock to a dog's skin in response to a remote activation at a radio controller held by a trainer. After a dog learns the meaning of a command, like "come," application of a shock helps to ensure compliance when the dog hesitates or chooses not to listen. Some shock collars include or work with Global Position Satellite (GPS) receivers that aid a trainer in the field by letting the trainer track the dog's position on a display included with the radio controller. Examples of such systems include the GARMIN ASTRO and ALPHA systems. Some pet recovery systems use GPS to track lost dogs and report the position of the dog to an owner through a website or smartphone application, such as the SPOTLIGHT pet recovery system available from the American Kennel Club. After a dog learns verbal commands, advanced training usually involves the use of whistles to send commands over long distances. A good trainer who uses training tools in an appropriate manner can have a dog with smart genes trained to hunt in a month or two.

One difficulty with training dogs using shock collars is that dogs become "collar smart." If a dog figures out that he only gets shocked when a collar is on, he soon learns not to behave absent the collar. Worse, if the dog learns that the trainer has a shock collar but the master does not, the dog might decide to hear the trainer but not the master—who, incidentally, pays the trainer and buys the dog food. Most city dwellers burn years of kitchen passes when they buy an expensive hunting dog. If that dog won't hunt, the poor fellow has to do a load of dishes to pay for an expensive training collar. Ironically, once he gets the collar and puts it on the dog, he will probably not have to use it more than a couple of times to teach the dog to listen.

Simple old-fashioned training worked with Kali, but that bell around her neck has made her hard of hearing in her old age; as a result, the whistle too often goes unheard. Newfangled training tools work and help to make hunting more pleasurable for both the dog and his master. A hunter should not have to spend a lifetime of kitchen passes to have training tools—bells and whistles included—that work at home, work simply, and work well.

SUMMARY OF THE INVENTION

Therefore a need has arisen for a system, apparatus and method which adapt a mobile telephone to work as a dog training tool.

In accordance with the present invention, a system and method are provided which substantially reduce the disadvantages and problems associated with previous methods and systems for training a dog. A training application executing on a mobile computing platform, such as a mobile telephone or tablet computer, provides interactions with a training module deployed at a dog collar to perform training functions. Processing, display and communication resources of a mobile telephone are leveraged to provide a dog training system that is simple, reliable and not costly.

More specifically, in one embodiment, a mobile telephone processor executes a training application that coordinates training information and actions for training a dog, such as a pointer bird dog. The training application communicates with a dog collar using existing WWAN, WLAN and/or WPAN interfaces of the mobile telephone. The dog collar includes a GPS receiver that sends dog position information to the training application for presentation on the mobile telephone display, such as with a map of a hunt boundary that shows the relative position of the mobile telephone to the dog, to other dog collars and to other mobile telephones interfaced through an ad hoc, client/server or other type of WLAN supported by an 802.11 interface or by a mobile telephone circuit Internet interface transmitted through a mobile telephone service provider network. A shock device on the collar provides corrective stimulus to the dog based on a wireless signal issued from the mobile telephone. A headset and handset interface with the mobile telephone through a WPAN interface so that an end user may issue commands to the mobile telephone and listen to information from the mobile telephone in a hands-off mode. For instance, a wireless microphone accepts a verbal command "where dog?" to the training application running on the mobile telephone. The training application responds to the command by determining the dog position from the collar GPS retrieved through a text message sent by a WWAN mobile telephone circuit. Once the training application receives the dog's GPS position, the training application issues an audible "100 yards west" to the end user through a wireless headset Voice over Internet Protocol (VoIP) and videoconferencing supported through a WLAN or WWAN Internet interface allows a hunter to communicate verbally with a dog over an extended distance through a speaker of the collar and to see via a remote camera what the dog is pointing.

In one alternative embodiment, power consumption at a collar and radio transmission interference with communications of a collar are reduced by selectively suppressing or otherwise altering communication of position information from the collar. For instance, a training application executing on a mobile telephone assigns different frequencies and/or time slots to each of plural collars for communicating position information to an adapter or to a mobile telephone. A tunable transceiver of an adapter tunes radio frequencies for communicating with each of plural collars and synchronizes communications with a time slot assignment for each collar. Collars power down to a reduced-power consumption standby state, such as by powering down a collar transceiver, outside of a time slot assigned to the collar for transmission, thus preserving battery charge at the collar. Transmissions at a collar during time slots for the collar are selectively suppressed based upon changes in position of the collar relative to a previous transmission, or based on other predetermined factors. For instance, if a dog is on point then a collar suppresses position transmissions scheduled for one or more time slots while the dog's position remains relatively immobile, such as within 5 meters of the last position transmission. As another example, if a dog's velocity vector remains constant, the collar suppresses position transmissions since a virtual inertial navigation system on a mobile phone can track position based on a velocity vector determined from accelerations and orientation measured at the collar or determined from a history of GPS positions at plural times. An adapter listens during each time slot in case an update is transmitted from a collar and tracks reliability of position information by having position updates at minimal intervals, such as every minute. In one embodiment, a GPS receiver clock signal is used as a reference clock for collar, adapter and ad hoc 802.11 (b, g or n) communications to maintain synchronous communications, reduce interference and improve the precision at which a collar and adapter can sleep, wake and communicate with each other. Alternatively, a collar wakes at times known to the adapter so that the adapter can transmit to the collar when position information is desired. In one example embodiment, Bluetooth (or other WPAN or alternatively WLAN) communications directly between a mobile telephone and a collar allow sleep of a UHF/VHF transceiver on the collar and on an adapter as long as Bluetooth pairing is maintained, such as anytime a collar comes within 10M or so of a paired mobile telephone.

The present invention provides a number of important technical advantages. One example of an important technical advantage is that the processing and communication capabilities of a smartphone are leveraged to enhance dog training with communications to a dog collar. Knowing the position of a dog and other hunters through mobile telephone communications enhances dog training and hunter safety. Hands-off control of dog activity through wireless peripherals of a smartphone allows a hunter to perform dog training activities without fumbling for a phone or other device. Leveraging smartphone capabilities to interact with a dog collar provides top-rate performance at an everyman cost controllable by an end user, who chooses whether to rely on basic mobile telephone WLAN 802.11 capabilities with minimal hardware costs or to rely on more expensive and expansive capabilities provided by interacting with a dog collar over a WWAN mobile telephone account or with an adapter that extends the range of direct radio communications by the mobile telephone to the dog collar.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Mobile telephones provide a dog training tool by interacting with a wireless communication module included on a collar on the dog. Depending upon the needs and desires of the dog's master, the mobile telephone provides short or long range training assistance, such as presentation of a GPS location of the dog relative to the master and stimulation to the dog from a shock collar or other training aid located on the collar. A training application running on the mobile telephone provides training functions that coordinate communications with one or more dog collars and with one or more other mobile telephones. For example, an ad hoc network within a hunting boundary is defined by plural training applications running on plural mobile telephones to provide enhanced coordination of dog training activities. The training application leverages capabilities generally included in mobile telephones so that advanced features are provided without costly specialized hardware. Mobile telephones, also known as cell phones or cellular phones, will work with a remote dog collar as envisioned herein by using existing wireless capabilities of the mobile telephone to communicate directly with a dog collar by a radio communication from the mobile phone directly to the dog collar and from the dog collar directly to the mobile phone. Generally, a mobile telephone has a form factor that provides a telephone handset, a touchscreen display to present information and accept inputs, and at least a WWAN transceiver to communicate wirelessly with a mobile telephone service provider network, such as with voice telephone communications, text message communications and data Internet communications like a web browser. In addition, a mobile telephone usually includes an 802.11 transceiver in the 2.4 and/or 5 GHz band to communicate through a wireless local area network (WLAN) and to communicate via short range wireless personal area network (WPAN) Bluetooth interfaces and a 60 GHz short range antenna for WPAN peripheral communications. Other types of mobile computing devices that include similar capabilities may also be used with the dog collar describe herein, such as tablet computing devices equipped with WWAN and WLAN capabilities.

Figure 1:
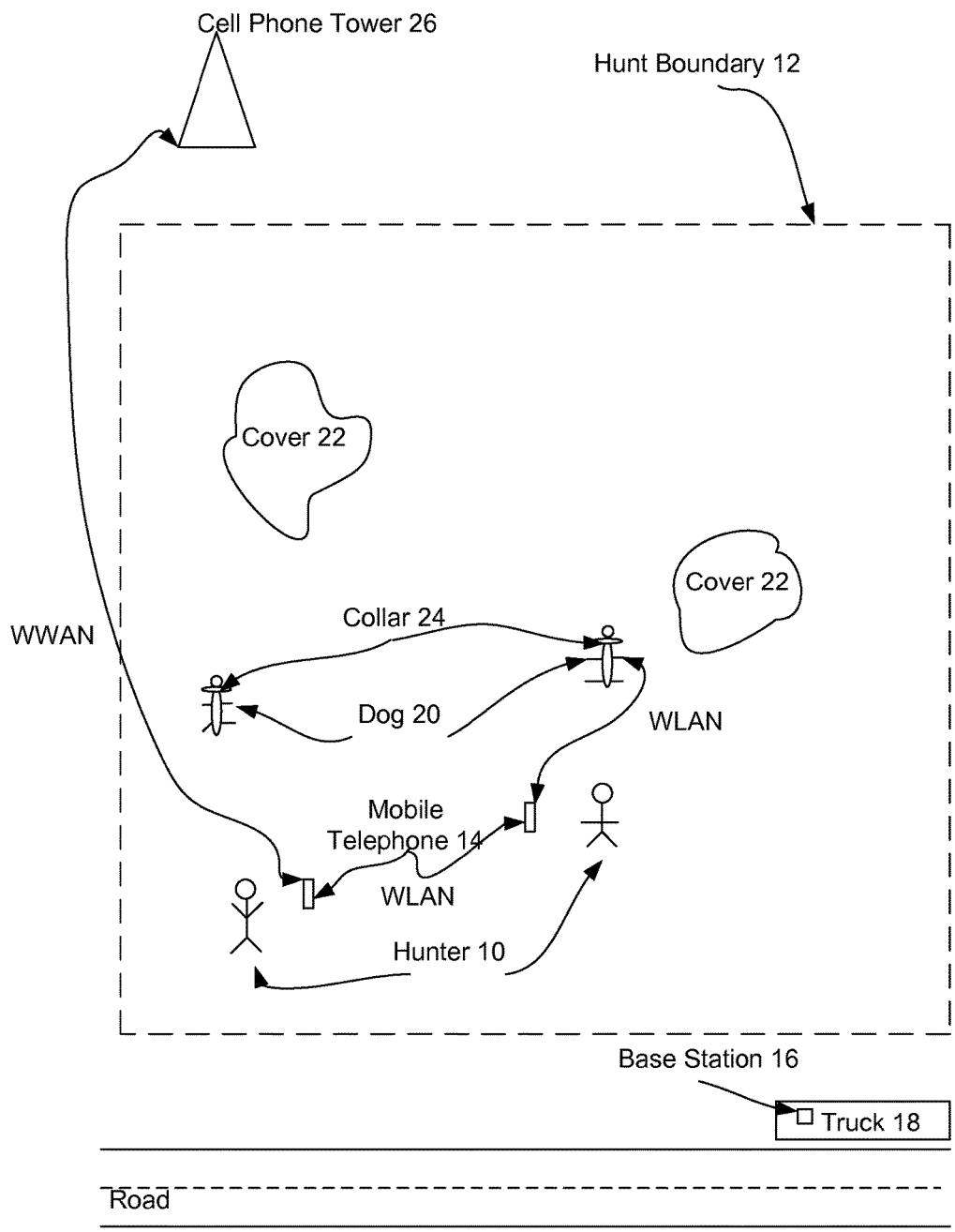
FIG. 1 depicts an example of a mobile telephone dog training system deployed in a hunting environment.

Referring now to FIG. 1, an example is depicted of a mobile telephone dog training system deployed in a hunting environment. Plural hunters 10 are deployed within a hunt boundary 12, each with a mobile telephone 14 that communicates through at least one wireless network. A base station 16 located at a truck 18 may be a mobile telephone or other computing device, such as a laptop or tablet computer, having an oversized antenna and amplified wireless signal to act as a relay or repeater station between mobile telephones 14 or between network communications, such as a WWAN and WLAN communication. Although the example embodiment uses mobile telephones 14 with hunters 10, in alternative embodiments, other computing devices may be used. Examples of mobile telephones 14 include APPLE iPhones, SAMSUNG GALAXY phones or other types of smartphones. Examples of base station 16 include APPLE iPADs, ANDROID-based tablets or other portable computer systems, such as clamshell laptop devices. In one example embodiment, hunt boundary 12 is the training area of a kennel so that base station 16 is a fixed desktop computer system.

One or more dogs 20 are deployed in hunting boundary 12, such as to hunt one or more areas of cover 22 for game birds like quail or pheasant. Each dog has a collar 24 that includes a communication module for communicating with mobile telephones 14 and each collar has a training module for providing a training function coordinated with mobile telephones 14. Communications between mobile telephones 14, base station 16 and collars 24 are supported in a number of different manners depending on the types of communication bands and protocols that are supported by mobile telephones 14 and collars 24. In one embodiment, a wireless local area network (WLAN) device, a wireless wide area network (WWAN) device and a wireless personal area network device (WPAN) are selectively included on each of mobile telephones 14 and collars 24 by assembly of one or more appropriately configured wireless communication modules to collar 24. Wireless communication coordinated through one or several of these wireless communication devices provides training applications running on mobile telephones 14 and base station 16 with training information for each other and collars 24, such as GPS positions, and with a medium for sending training commands, such as shock collar stimulus.

One example of wireless communications is communicating training information and commands between a collar 24 and a mobile telephone 14 through an IEEE 802.11(n) ad hoc or server/client WLAN interface. For instance, a training application on a mobile telephone 14 acts as a server and one or more collars 24 act as clients that send the server GPS position information, images from a camera aligned with a direction of a point for the dog 20 wearing the collar 24, a point alert from detection of lack of motion with an accelerometer in the collar 24, or other types of training information. The mobile telephone 14 server sends training commands to the one or more collars 24 that issue an electric shock or other stimulation at the collar, issue an oral command from a speaker on the collar, such as with a VoIP interface or with stored oral commands in a memory on the collar 24, or issue other types of commands. In an outdoor line-of-sight environment, an 802.11(n) WLAN interface has a range of approximately 250 m. If a collar 24 becomes out-of-range from one mobile telephone 14, then a second mobile telephone 14 that receives communications with the collar 24 and the other mobile telephone 14 can relay the training information and commands between the out-of-range collar and mobile telephone. Further, a WLAN interface between two or more mobile telephones 14 allows VoIP communication between the mobile telephones 14 so that hunters verbally communicate with each other. Although the example embodiment describes the use of 802.11(n) in the 5 GHz frequency range, in alternative embodiments, 802.11 (b) or (g) may be used with a possible increased range in the 2.4 GHz frequency range. In one example embodiment, a secured 802.11 network protected by a key or with HTTPS protocol may be used to avoid intrusion by others in the WLAN.

If a collar 24 becomes out of range for a WLAN interface with 802.11(n), WWAN communications may be used both with and without coordination by a cell phone tower 26. For instance, in remote areas mobile telephone service is sometimes not available or not reliable. In a situation where cell phone tower 26 is available, training applications on each mobile telephone 14 may use an Internet Protocol (IP) interface through a mobile telephone provider circuit to perform the same types of communications as are available through WLAN communications as described above. For instance, a VoIP, SKYPE or FACETIME communication will allow images and/or commands to be communicated between a collar 24 and a mobile telephone 20. As an alternative, text messages may be used to communicate information, such as with simple text, in an XML format or as a script executable by the training application. As an example, a collar 24 sends a text message with a GPS position at predetermined time intervals, such as every 10 seconds. As an alternative example, to save battery power at collar 24, a text message with a GPS position is sent based upon at least a predetermined change in position. For instance a text message is sent every 10 seconds unless the collars position has not changed by more than 10 feet, in which case no text message is sent until a position change of greater than 10 feet is detected or a greater time period has elapsed, such as another minute. This saves battery power during rest periods or when a dog is on point. Text messages may include attachments sent from a collar, such as an image captured by a camera associated with a collar. Text messages sent to a collar may include commands, such as a direction for the dog to turn, which is issued as an audible command by a speaker to have the dog 20 move in a desired direction. In one embodiment, a collar 24 intercepts IP packets or text messages sent from a mobile telephone by knowing the mobile telephone's network communication security codes so that the IP packet or text message need not transfer through a phone circuit at all. In alternative embodiments, other types of direct two-way communications may be accomplished between a mobile telephone 14 and a collar 24 with the WWAN or the WLAN frequency and protocol in the absence of mobile telephone service through a cell tower 26, such as through coordination with a mobile telephone service provider. One example is to re-program a WNIC of a mobile telephone to provide analog signals in the WWAN or WLAN frequencies to allow the mobile telephone to be used like a touch to talk service that mimics walkie talkie behavior or a remote control (RC) transceiver device. As one example, a WWAN type service may be provided with a WIMAX type of protocol, which provides approximately 1 mile of range.

A WPAN has a short range, such as that provided by 60 GHz frequency range protocols, Bluetooth or similar short range communication devices that support peripherals like wireless headsets for mobile telephones. In one example, a wireless headset is used by the training application running on the mobile telephone to issue audible information for a hunter or accept commands from a hunter. For instance, a lock tone is provided when the training application receives an indication from a collar that a dog as gone to point. The tone beeps at varying frequencies and with other alterations in sound to guide the hunter to the point, such as higher frequency tones when the mobile telephone is moving closer to the collar and lower frequency tones when the mobile telephone is moving further from the collar. A flush tone issues when the hunter reaches the location of the point as a warning to the hunter and as a warning to other hunters who have mobile telephones wirelessly interfaced with the hunter's mobile telephone or the dog's collar. As another example, a wireless handset coupled with an armband accepts inputs to buttons programmable by the hunter to accomplish training tasks, such as issuing stimulation from a shock device. As another example, a wireless camera mounted on top of the dog's head communicates images to a collar 24 so that the camera need not have a wired connection to the collar 24.

Hunt boundary 12 may be predefined before a hunt so that collars 24 will issue audible warnings if a dog attempts to leave the boundary, followed by stimulation. The boundaries and a map of the hunt area are stored on mobile telephone 14 ahead of time, such as from the Internet, in case phone service is not available to download a map during a hunt, such as at a remote location outside of the range of a mobile telephone service provider network. Hunt boundaries 12 may be programmed in memory of each collar 24 for an automated wireless fence around the hunt area enforced by logic at the collar or may be monitored automatically by a training application so that warnings and stimulations are sent through the WLAN or other communication medium as needed based upon a collar's position. In alternative embodiments, a base station 18 may be used to define a wireless fence at a hunter's home for use of the system when not hunting. For instance, the base station activates a "home" boundary loaded in memory of the collar so that logic on the collar can issue a stimulation if the position of the collar approaches, reaches or exceeds the home boundary. The boundary may be re-programmed as desired through a WLAN interface between the base station and collar. Breach of the boundary can also be programmed to notify the dog owner via mobile telephone that the escape has occurred and reduce the amount of time required to retrieve the wandering dog and the associated stress.

Figure 2:
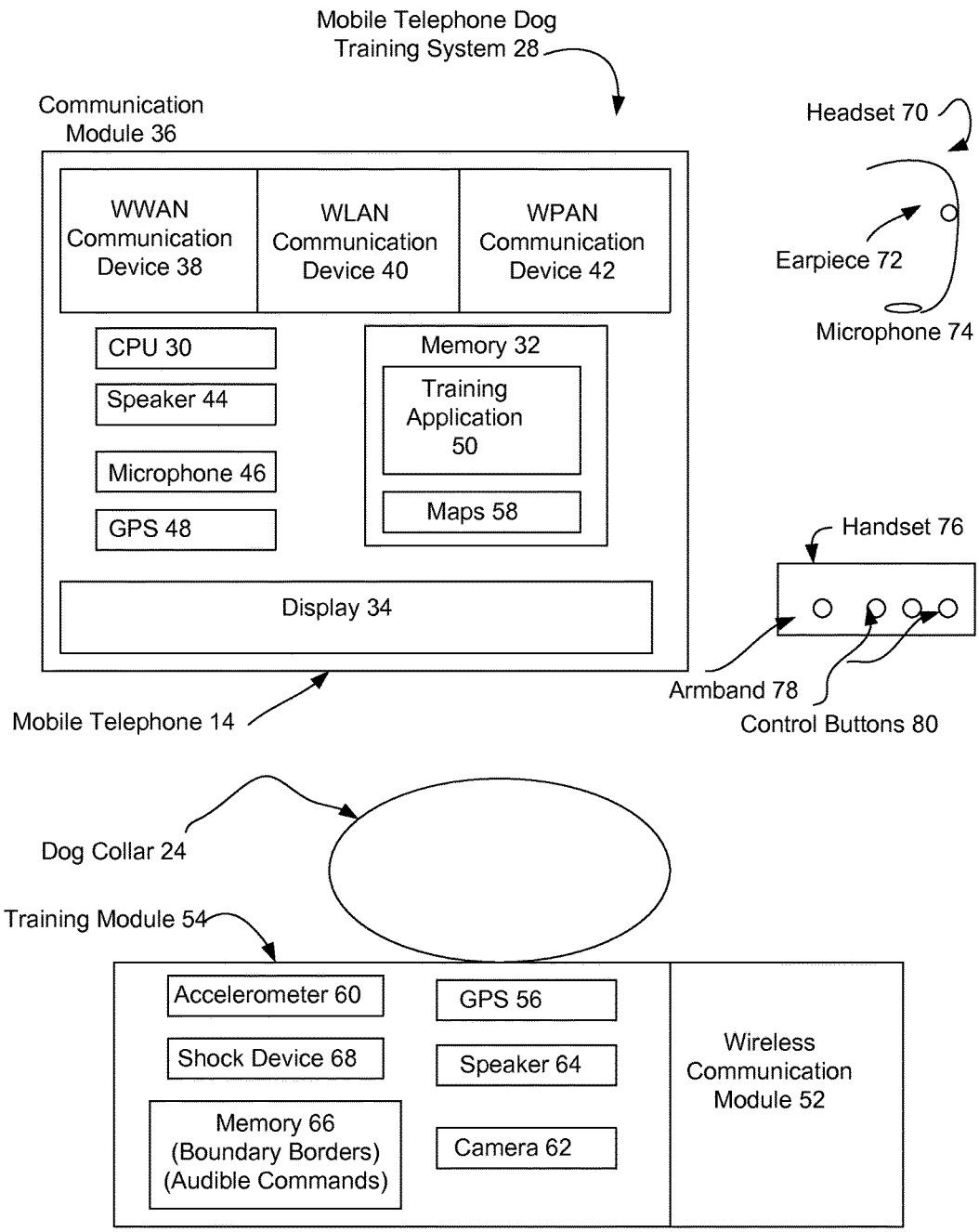
FIG. 2 depicts a block diagram of a mobile telephone dog training system.

Referring now to FIG. 2, a block diagram depicts a mobile telephone dog training system 28. Mobile telephone 14 is a smartphone having a CPU 30 and memory 32 that cooperate to execute instructions and present information as visual images at a touchscreen display 34. A communications module 36 cooperates with CPU 30 to perform smartphone communications. A WWAN communication device establishes communication with a WWAN, such as a mobile telephone service provider network that supports telephone circuit, text and Internet-type data interfaces. A WLAN communication device 40 establishes communication with a WLAN, such as an 802.11 network that supports Internet-type data interfaces. A WPAN communication device 42 establishes communication with a WPAN, such as Bluetooth or a 60 GHz band in a tri-band or WiGig network interface. Mobile telephone 14 includes a variety of other devices commonly found in smartphones, such as speaker 44 that outputs audible sounds, a microphone 46 that captures audible sounds and a GPS receiver 48 that determines a position of the device from GPS signals.

Mobile telephone 14 adapts for use as a dog training system by executing instructions of a training application 50 stored in memory 32, which coordinates the use of hardware and software of mobile telephone 14 for performing dog training functions. For example, training application 50 coordinates communication with dog collar 24 through communication module 36. In the example embodiment, dog collar 24 has a removably coupled wireless communication module 52 that couples to a training module 54 so that an end user can select the type of communications that the mobile telephone will have with collar 24. For instance, wireless communication module 52 may have single or plural types of receivers or transceivers for supporting different types of communications selected by an end user with different frequency bands and communication protocols. In one example embodiment, wireless communication module 52 is an analog or digital receiver, transmitter or transceiver radio in the amateur UHF or VHF radio bands that communicates with an adapter for the mobile telephone 14 as set forth in FIG. 3. In another example embodiment, wireless communication module 52 is a WWAN receiver, transmitter or transceiver that communicates in the WWAN band and protocol of mobile telephone 14. In another example embodiment, wireless communication module 52 is a WLAN receiver, transmitter or transceiver that communicates in a WLAN band and protocol of mobile telephone 14. Various combinations of receivers and transmitters may be couple to training module 14 as desired by an end user, including plural separate communication modules 52 each of which provide a different type of communication. For example, in one embodiment a WWAN transmitter permits sending of text messages to mobile telephone 14 with GPS position information while a WLAN receiver permits reception of shock collar stimulus commands. As another example, a WWAN receiver obtains a time stamp from a cell tower also in use by mobile telephone 14 so that the timeliness of commands sent through a WLAN interface can be verified at collar 24—this prevents delayed application of a shock stimulus sent by a WLAN command, which could otherwise correct a dog when the dog is no longer performing an inappropriate action.

Training module 54 may include a variety of components that support training functions in cooperation with training application 50. The training functions may be in one contiguous housing assembled from several separate housings to allow selection by an end user of desired functions. One example component is a GPS receiver 56, which determines the position of collar 24 from a GPS signal and provides the position information to mobile telephone 14 through wireless communication module 52. Training application 50 presents the GPS position of collar 24 at display 34 on a map 58 along with the position of mobile telephone 14 so that the end user can determine the relative position of collar 24 by looking at display 34. Another example component is an accelerometer 60, which detects movement of collar 24 and issues a point alert in the event of a lack of movement under predetermined conditions, such as for a predetermined time period, so that wireless communication module 52 communicates a point alert to mobile telephone 14. Another example component is a camera 62, which captures still or moving images of an area relative to collar 24 where a dog points and provides the images to mobile telephone 14 through wireless communications module 52. In one example embodiment, camera 62 is coupled to a dog separately from collar 24 and communicates images to collar 24 with a WPAN so that wireless communications module 52 can forward the images to mobile telephone 14. Another example component is a speaker 64, which provides audible commands, such as either recorded voice or whistle tweets stored in memory of collar 24, that a dog wearing collar 24 can hear. Speaker 24 may present audible commands, either recorded voice or whistle tweets, provided through a VoIP interface with mobile telephone 24 and communicated through wireless communication module 52. For instance, an end user can speak a command audibly captured at mobile telephone 14 and played at speaker 64 or may press a button that issues an audible command from memory of mobile telephone 14. Alternatively, speaker 64 may present audible commands, either recorded voice or whistle tweets, in response to texts or other data that retrieves the commands from a memory 66, such as a turn or a whoa command. Another example component is a shock device 68 that applies a shock to a dog that is wearing collar 24 in response to a command received through wireless communication device 52. In alternative embodiments, alternative types of positive or negative reinforcements may be used, such as a clicker that issues clicks, a squirter that squirts a fluid, a vibrator that vibrates, etc. . . .

Mobile telephone 14 includes WPAN communication that supports interactions with local peripheral devices to give a hunter hands-off interactions with collar 24. For example, a wireless headset 70 includes an earpiece 72 to play audible sounds in an end user's ears and a microphone 74 to capture commands by the hunter. Headset 70 interacts with a Bluetooth or other types of WPAN interfaces to communicate with mobile telephone 14. Another example is a wireless handset 76 that has an armband or other coupling device to make control buttons 80 accessible to a hunter in a convenient location distal mobile telephone 14. For instance, armband 78 couples to a hunter's wrist or gun to provide a collar selector that selects one of plural collars 24 at which to output a shock correction while the hunter's mobile telephone rests in a pocket or safe location. As another example, handset 76 keeps a body count of birds by species to help a hunter avoid violating a game bag limit. As the hunter gets a bird, the hunter hits a button associated with the species to allow training application 50 to track the number of the species taken. When a limit is reached, the hunter receives an audible warning in earpiece 72: "You have reached your pheasant bag limit, don't shoot!" Handset 76 can also be used to track other hunting information including location of points or flushes, water sources, or other geographic features which can be downloaded after the hunt for further analysis. In one example embodiment, the sound of a gun shot picked up by a microphone is recognized by training application 50 and automatically marked. At an appropriate time after the gun shot, the hunter is invited to speak a memo of what happened, which is save in association with the location. The inquiry may also include a request to update the body count. In one example embodiment, if the hunter responds to a body count inquiry with "shutup," no additions are made to the body count and the hunter is reminded that he should attend church on Sundays instead of hunt.

An example of the mobile telephone dog training system 28 in use follows, but is intended only as an example of how one embodiment of the system may be used. A hunter plans a hunt and stores the hunt boundary in a map 58 of memory 32 of mobile telephone 14 that the hunter retrieves from the Internet. The morning of the hunt, the hunter attaches first and second wireless communication modules 52 to collar 24 and puts the collar on his hunting dog. One wireless communication module 52 receives and transmits WWAN communications and the other receives and transmits 802.11(n) WLAN communications. The dog is released to hunt and disappears in cover. A moment later, accelerometer 60 detects that the dog has stopped moving and gone on point. The WLAN communication module 52 attempts to send a point alert to the hunter but fails to receive a response from training application 50. In response, the WWAN wireless communications module sends a text with the point alert to the hunter's telephone number. The hunter's mobile telephone 14 intercepts the text on its way to the cell tower and also receives the text message from the cell tower and, in response, issues a point alert through a WPAN to an ear piece 72 of wireless headset 70. The text includes the position of the point included from a GPS component 56 of collar 24 so that training application 50 provides the hunter with audible guidance towards the point position. As the hunter approaches, training application 50 initiates a video conference with camera 62 to capture an image of the point through WLAN communication device 40. If the point is on a skunk or snake, the hunter touches a control button 80 on a handset 76 secured to his wrist with an armband 78 to issue a shock from shock device 68. In one embodiment, the image includes infrared information to help distinguish varmints from birds. If the point is on a bird, the hunter issues a "WHOA" command from memory 66 or through a voice WLAN interface with speaker 64, such as a VoIP interface. As the hunter approaches the point position, a "flush" alert is issued to all mobile telephones interfaced with the WLAN so that all hunters are prepared. For instance, a training application running on each mobile phone monitors the dog position and the hunter position with WLAN communication and issues a flush alert when the hunter reaches a predetermined location proximate the dog. After the flush, training application 50 tracks the body count so that the hunter does not exceed his allowed bag limit.

Figure 3:
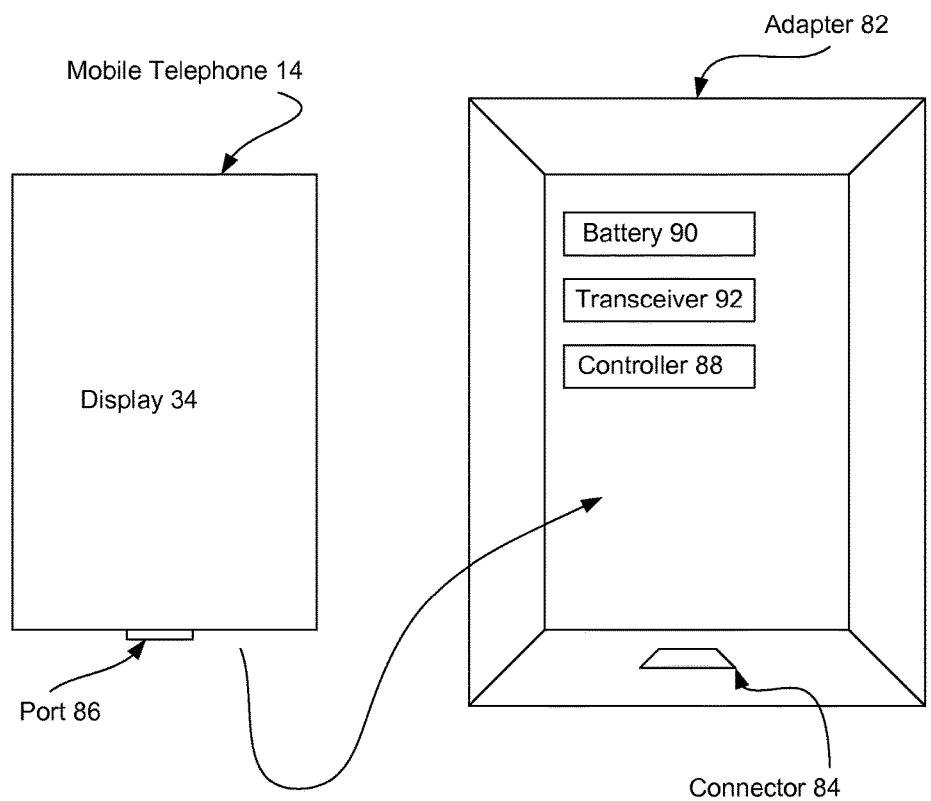
FIG. 3 depicts an adapter to accept a mobile telephone for interacting with a dog collar.

Referring now to FIG. 3, an adapter 82 is depicted to accept a mobile telephone 14 for interacting with a dog collar 24. Adapter 82 forms an opening to accept mobile telephone 14 with a connector 84 aligned to couple with a port 86 so that a controller 88 can interface with training application 50. Training application 50 provides information and instructions to controller 88 for sending and receiving communications with transceiver 92 of adapter 82, such as in a frequency band not available with the transceivers of mobile telephone 14. Adapter 82 includes a battery 90 to boost the charge life of mobile telephone 14 and a transceiver 92 to act as an intermediary between mobile telephone 14 and collar 24. Transceiver 92 offers improved radio communication range and reliability in a number of different ways depending on the user preference and the environment. For example, transceiver 92 provides increased range of communications from WLAN communications device 40 by amplifying or boosting WLAN signals. Alternatively, transceiver 92 communicates in a different radio band, such as a lower frequency band having greater range than the WLAN frequency band, with analog or digital signals to act as an intermediary communication medium when out of WLAN communication range. In one embodiment, training application 50 automatically detects the adapter and selects the radio band and protocol to use for communication based upon the range to collar 24. For instance, training application 50 uses a WLAN interface when the GPS position indicates collar 24 is within WLAN range and uses the intermediary frequency of adapter 82 when the GPS position indicates collar 24 is out of WLAN range. Adapter 82 provides a more robust system for hunters who desire to spend extra money on the extra feature; however, for many infrequent hunters who use collar 24 for yard work and occasional hunting trips, a WLAN range of 250M provides adequate range and reliability. In one embodiment, adapter 82 includes a waterproof protective case to hold mobile telephone 14 in a secure manner. In one embodiment, a larger sized adapter works for tablet type of devices that can include WWAN and WLAN capabilities. In another alternative embodiment, adapter 82 includes a WPAN so that it can boost the range of a mobile telephone 14 that is maintained separately and not inserted into adapter 82. For example, a hunter can strap adapter 82 on his back with an extended antenna for better range and the adapter communicates through a WPAN with a mobile telephone in the hunter's pocket as if the mobile telephone were coupled in adapter 82.

Figure 4:
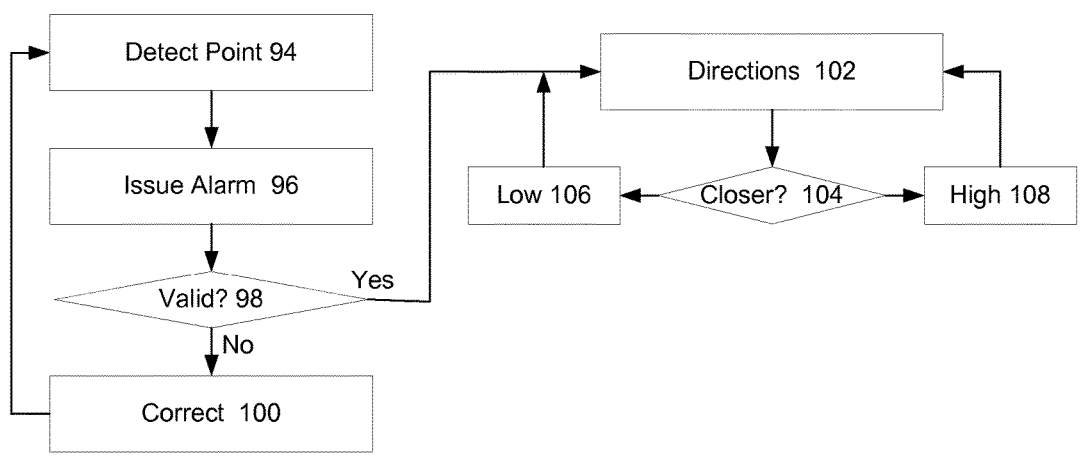
FIG. 4 depicts a flow diagram of a lock and tone process for guiding a hunter to a dog on point

Referring now to FIG. 4, a flow diagram depicts a lock and tone process for guiding a hunter to a dog on point. The process begins at step 94 with detection of a point, such as with an accelerometer or lack of change of GPS position. At step 96, an audible point alarm is issued and an image of the point is presented at the mobile telephone display. In one embodiment, the alert and image is presented from the mobile telephone by a WPAN communication to glasses that the hunter is wearing along with a translucent map or a square or dot that indicates the location of collar 24 relative to the lens of the glasses. The hunter is thus able to see a map of the dog's position and an indication with a red dot or "target box" of where the hunter should look to see the dog through the glasses. At step 98, a determination is made of whether the point is a valid point on a game bird species or an invalid point, such as a point on a non-bird animal (a snake or skunk). If not a valid point, the process goes to step 100 to issue a correction, such as a shock stimulus, and returns to step 94. If a valid point at step 98, the process continues to step 102 to provide directions to the location of the point. If at step 104 a determination is made that mobile telephone position has moved further from the point position, the process continues to step 106 to issue a lower tone sound and then returns to step 102. If at step 104 a determination is made that the mobile telephone position has moved closer to the point position, the process continues to step 108 to issue a higher tone sound and then returns to step 102. Alternatively, directions at step 102 can present as computer generated audible directions, such as turn left or right, or flush in 10 yards.

Figure 5:
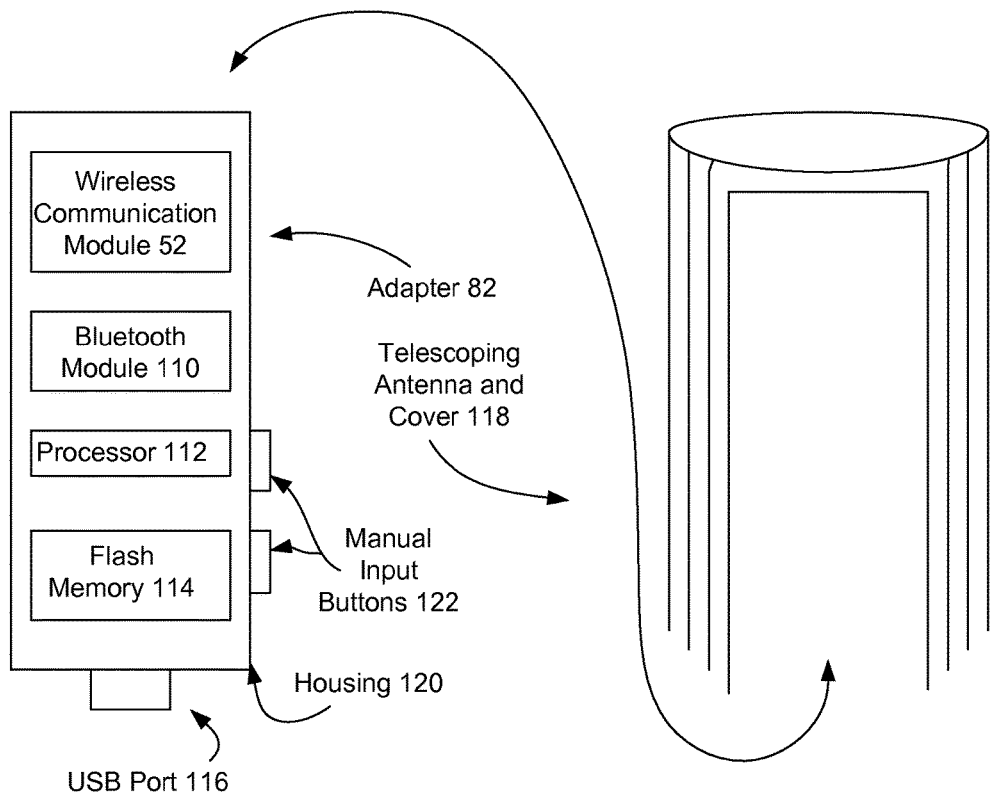
FIG. 5 depicts a side view of an example embodiment of an adapter for providing UHF and VHF frequencies and that interacts with a wireless telephone through a WPAN for relaying information to and from a dog collar.

Referring now to FIG. 5, a side view depicts an example embodiment of adapter 82 for providing UHF and VHF frequencies and that interacts with a wireless telephone 14 through a WPAN for relaying information to and from a dog collar 14. Wireless telephone 14 includes a training application as set forth above, such as to present a GPS position at a display that is provided from a collar 24 to an adapter 82 and then through a WPAN interface to mobile telephone 14. Adapter 82 includes a Bluetooth module 110 to provide WPAN functionality for communication with a Bluetooth transceiver of mobile telephone 14. A processor 112, such as a low power ARM integrated circuit, executes instructions stored in a flash memory 114 to perform adapter functions as set forth above and below. In one embodiment, ARM processor 112 is an embedded controller for Bluetooth module 110 that provides processing support for other functions as described herein. A USB port 116 interfaces with processor 112 to allow programming of instructions in memory 114, such as updates and patches; to retrieve information from memory 114 to an external device, such as a history of GPS positions tracked from collars 24; and to charge a battery of adapter 82. In the example embodiment, adapter 82 has the footprint of a pen or marker to fit in a pocket and a telescoping antenna 118 that slides over a housing 120 of adapter 82 to provide protection when adapter 82 is not in use. For instance, an end user carries adapter 82 in a shirt pocket like a pen until ready for use, and then extends telescoping antenna 118 and places adapter 82 in a hat band or other holder that maintains antenna 118 in an elevated position for improved radio reception and transmission range. In one embodiment, adapter 82 includes a GPS receiver of its own and provides an adapter position to mobile telephone 14 so that mobile telephone 14 can use the adapter position instead of or in combination with a GPS position determined by a GPS receiver in the mobile telephone.

Manual input buttons 122 are disposed on housing 120 of adapter 82 to accept touch inputs from an end user and report the touch inputs through Bluetooth module 110 to a mobile telephone 14 or dog collar 24, or through a wireless communication module 52 to a dog collar 24. Manual input buttons 122 are manually programmable by an end user to have varying functions that fit the user's desires based upon operating conditions of adapter 82, mobile telephone 14 and dog collar 24. For instance, an end user defines a close-in display presentation for when collars 24 are in close range, such as Bluetooth range, and a distal display presentation for when collars 24 are distant, such as outside of Bluetooth range. One of the manual input buttons 122 provides a hot-key that an end user touches to select the close-in or distal display presentation. As another example, an end user defines a first display presentation showing a compass and a full screen map with dog positions and a second display presentation with a half-screen map with dog positions and a half-screen with statistics, such as bag limits and kills for the day. The user prepares various display presentations at mobile telephone 14 and mobile telephone 14 provides the selected presentations when a Bluetooth communication from adapter 82 indicates an end user input at a button 122 to hot-toggle between display presentations. Alternatively, a selected presentation is made based upon a distance to collar 24, such as the compass and full screen map if collar 24 is outside of Bluetooth range and the half-screen with statistics if the collar is within Bluetooth range.

In one example embodiment, wireless communication module 52 disposed in adapter 82 includes a 900 MHz transceiver to provide moderate range of a mile or less and a 150 MHz transceiver to provide increase range of greater than a mile. In an alternative embodiment, a Silicon Labs EZRadio Si446X transceiver provides a selectable range of frequencies from 119 MHz to 1 GHz and transmits at a frequency set by mobile telephone 14 based in part upon distance to a dog collar 24. For instance, the transceiver steps between 900 MHz and 150 MHz based upon range to collar 24, signal strength from collar 24 and interference received from other transceivers. The use of either Bluetooth, 900 MHz, 150 MHz or other frequency signals to communicate with dog collar 24 is selected based upon logic running on processor 112 or logic running on mobile telephone 14 that provides control instructions through Bluetooth communications to processor 112. In one embodiment, an end user preselects frequencies at mobile telephone 14 for use by adapter 82 at various ranges so that plural systems operating in the same area have frequency ranges for use that are away from each other to avoid interference. For instance, one mobile telephone adapter 82 uses 850 MHz with range of less than one-half mile and 145 MHz with range of greater than one-half mile; another nearby mobile telephone phone adapter uses 900 MHz with range of less than one-half a mile and 150 MHz with range of greater than one-half a mile. A mobile telephone associated with each adapter communicates with each other in an ad hoc peer-to-peer 802.11(n) network to maintain frequency separation by defining for each other the frequency assigned for use by each mobile telephone's adapter. Alternatively, the mobile telephones 14 communicate with an ad hoc peer-to-peer network to establish the use of common frequencies in different time slots to avoid interference yet allow monitoring of each other's collars. In one embodiment, frequencies and time slots are determined beforehand and separately stored in each mobile telephone with coordination provided by a computer application. For example, an XML file stores time slots, frequencies, collar identifiers and map coordinates for plural mobile telephones 14 so that each mobile telephone can download and apply the information at the time of a hunt. For instance, a website stores plural XML files that end users can download to apply desired configurations, such as based on the number of mobile telephones and collars, to have a preconfigured hunt with assigned frequencies and time slots for each collar and mobile telephone. On the start of a hunt, the mobile telephones distribute the preconfigured assignments to the collars with Bluetooth communications.

Figure 6:
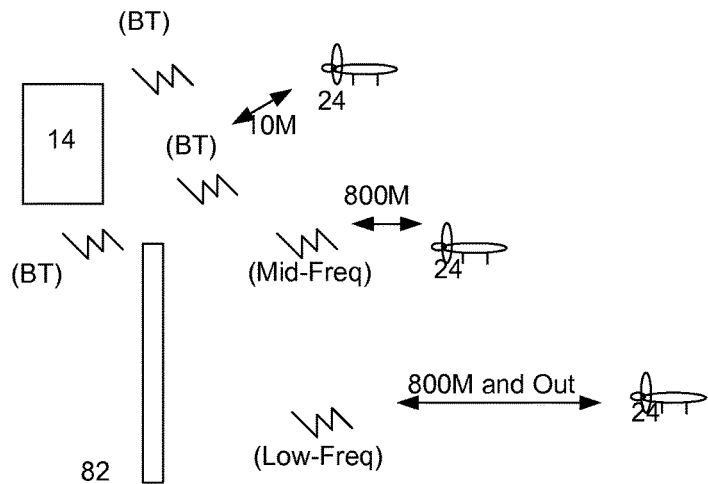
FIG. 6 depicts an example of a mobile telephone interacting with an adapter and a collar through plural radio frequencies, such as under management of a training application.

Referring now to FIG. 6, an example is depicted of a mobile telephone 14 interacting with an adapter 82 and a collar 24 through plural radio frequencies, such as under management of a training application as set forth above. Upon initial setup, mobile telephone 14 pairs with Bluetooth to both adapter 82 and dog collar 24. Mobile telephone 14 retrieves identifiers from adapter 82 and dog collar 24 so that the devices are automatically configured to communicate with each other using the wireless communication module 52, such as a packet header or other identifier to link adapter 82 with collar 24 and a frequency assignment for both devices to use in mid and low frequency ranges. In one alternative embodiment, initial configuration may be performed with a near field communication (NFC) device in mobile telephone 14, adapter 82 and collar 24. Initially, dog collar 24 provides GPS information to both adapter 82 and mobile telephone 14 with the Bluetooth pairing. Bluetooth communications consume minimal power and provide a range of around 10M so that during the initial phase of a hunt while the dogs are in close to mobile telephone 14, battery consumption of dog collars 24 is reduced relative to communications in other frequencies. In one alternative embodiment, GPS positions are not provided from collar 24 to mobile telephone 14 when Bluetooth pairing exists since the distance is small. In another embodiment, with the exception of an initial test to ensure operability of adapter 82, mobile telephone 14 commands adapter 82 through a Bluetooth communication to remain idle while mobile telephone 14 has Bluetooth pairing and communication with dog collar 24. Although Bluetooth is rated as having a range of 10M, the communications take place at 2.4 GHz, the same as a WLAN 802.11 (b or g) communication, and thus may work at greater effective ranges to provide GPS coordinates from dog collar 24 directly to mobile telephone 14 when a dog is hunting close in or when a hunter approaches a dog, such as a dog on point. Further, in one example embodiment, the Bluetooth signal may be amplified from dog collar 24 to increase Bluetooth range to mobile telephone 14, such as by providing a higher strength signal as distance increases based upon GPS coordinates analyzed at mobile telephone 14 or collar 24.

Once dog collar 24 reaches the limit of Bluetooth communication directly with mobile telephone 14, such as when a dog ranges out to start hunting, mobile telephone 14 initiates adapter 82 with a Bluetooth communication to adapter 82 so that a mid-frequency may be used to collar 24, such as communication with a 900 MHz radio. Adapter 82 initiates communication with dog collar 24 through the mid-frequency to retrieve GPS coordinates from dog collar 24 and provides the GPS coordinates to mobile telephone 14 through Bluetooth communications. If the signal strength of the mid-frequency transceiver communications between dog collar 24 and adapter 82 becomes weak or the GPS coordinates of collar 24 relative to adapter 82 indicate a range at the outside of the mid-frequency range, then mobile telephone 14 initiates the use of a low-frequency, such as 150 MHZ, by adapter 82 to dog collar 24. Adapter 82 sends a frequency change command in the mid-frequency range to dog collar 24 so that dog collar 24 can reset the frequency with a matching transceiver. As range decreases between adapter 82 and dog collar 24, such as when a hunter approaches a dog on point, mobile telephone 14 returns adapter 82 and collar 24 to the use of the mid-frequency followed by the Bluetooth communications for obtaining GPS coordinates from dog collar 24. An advantage of using a mid-frequency is that it tends to consume less power and communicate more information than a lower frequency. In addition, mid and low frequencies have different characteristics so that one may work better than the other under different operating conditions, such as caused by weather, water, terrain, cover, etc. . . . Further, in areas where a number of hunters are using mid or low frequencies, the availability of a second (or other tunable) frequency band will improve system reliability by decreasing interference.

Figure 7:
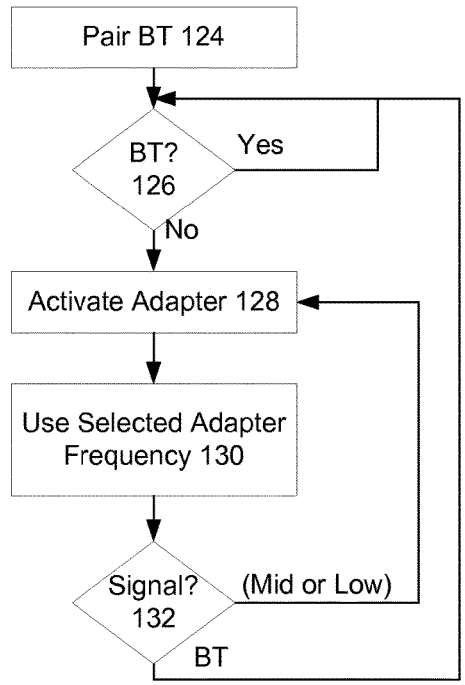
FIG. 7 depicts a flow diagram of a process for determining a frequency for communication with a dog collar.

Referring now to FIG. 7, a flow diagram depicts a process for determining a frequency for communication with a dog collar 24. For example, the process is provided by a training application executing on a mobile telephone 14 as set forth above. The process starts at step 124 with a pairing of Bluetooth transceivers located in mobile telephone 14, adapter 82 and collar 24. During pairing, configuration information is provided between the devices to enable communication of GPS position from collar 24 to adapter 82 and then to mobile telephone 14 for presentation at a display of mobile telephone 14. For example, an identifier for each device is provided to the other devices so that mobile telephone 14 can track GPS positions for the desired collar or collars 24. During pairing at step 124, a test may be performed to confirm operation of wireless communication module 52 for communication between adapter 82 and collar 24 to ensure that the desired frequencies are operational, such as frequencies selected for use by the hunter that day. Once pairing is complete, Bluetooth communications are maintained between mobile telephone 14, adapter 82 and collar 24 while Bluetooth-compatible ranges are maintained. Maintaining communication by Bluetooth through the early part of the hunt reduces power consumption by adapter 82 and allows automated activation of adapter 82 once pairing with collar 24 is lost or when Bluetooth communication of GPS coordinates indicates a threshold range, such as greater than 10M. Hunters thus do not have to manually place systems on and standby between hunts, and power is preserved by avoiding mid and low frequency transmissions when not necessary. At step 126, a determination is made whether Bluetooth pairing is maintained with dog collar 24 by adapter 82 or mobile telephone 14. If yes, the process returns to step 124 to continue monitoring GPS coordinates by Bluetooth communications. If no, the process continues to step 128 to activate adapter 82. In one example embodiment, transition from Bluetooth communication to adapter communication and back to Bluetooth communication may be aided by applying GPS coordinates of collar 24 compared to GPS coordinates of mobile telephone 14 to determine when Bluetooth range has reached a likely limit. When accurate range information is available so that adapter 82 uses wireless communication module 52 to communicate with dog collar 24, the Bluetooth transceiver or collar 24 may be idled to stop transmitting, thus saving additional power while the range between mobile telephone 14 and dog collar 24 is too great to communicate with Bluetooth. Once GPS coordinates of collar 24 and mobile telephone 14 indicate a Bluetooth compatible range as indicated by communications between adapter 82 and collar 24, Bluetooth transmissions may resume and transceiver 52 may be powered off.

At step 128, a determination is made of the frequency that adapter 82 will use to establish communications with dog collar 24. In one embodiment, the frequency is determined in mobile telephone 14 and sent by a Bluetooth communication to adapter 82. For example, upon initially leaving Bluetooth range, a mid-frequency is selected for adapter 82. As range between adapter 82 and collar 24 increases, a transition to a low-frequency is performed based upon a number of factors, including: distance determined from GPS coordinates, signal strength, vector (speed and direction) of collar relative to frequency range capabilities, interference from other radios, etc. . . . Similarly, as range between adapter 82 and collar 24 decreases, a transition to a mid-frequency from a low frequency is performed. In one alternative embodiment, determination of the frequency for adapter 82 may be made with logic operating on adapter 82. For instance, when mutual communication between adapter 82 and collar 24 has not taken place for a predetermined time period, a recovery frequency is selected to attempt to establish mutual communication. In one embodiment, the timing of the recovery frequency attempt is based upon GPS clock signals so that power at collar 24 and adapter 82 is not needlessly wasted attempting to re-establish communications. At step 130, communications are performed at the determined frequency. At step 132, a determination is made of whether Bluetooth communications are re-established. If so, the process returns to step 126. If not, the process returns to step 128 to re-verify the frequency for use by adapter 82 to communicate with collar 24. When a new frequency is selected, the frequency is passed to collar 24 with the existing frequency so that communications are re-established on the new frequency.

Figure 8:
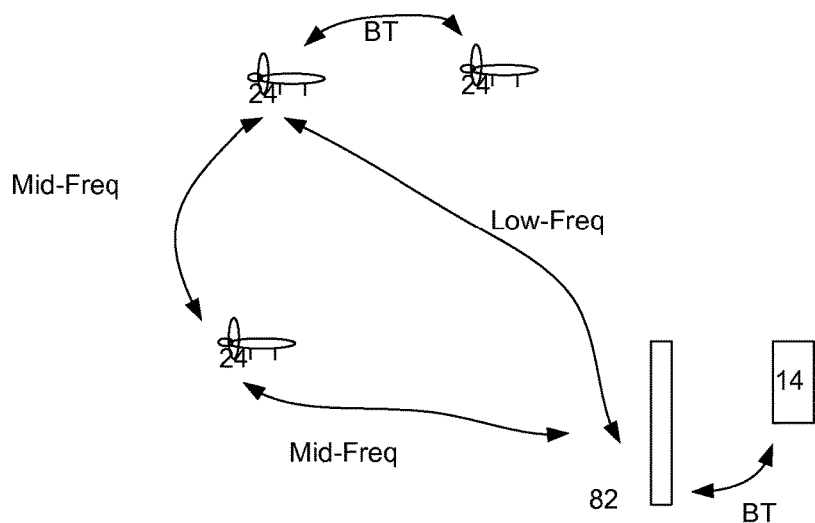
FIG. 8 depicts an example embodiment of a system that tracks multiple dog collars at one or more mobile telephones using one or more adapters.

Referring now to FIG. 8, an example embodiment is depicted of a system that tracks multiple dog collars 24 at one or more mobile telephones 14 using one or more adapters 82. Management of the multiple dog collars is performed, for example, by a training application running on one or more mobile telephones 14 as set forth above. In one example embodiment, the training application distributes logic and communication parameters to adapter 82 and collar 24. If one or more collars 24 are within Bluetooth range of each other, then the collar 24 having the most battery power is selected to use mid or low frequency communication with adapter 82 while the other collars 24 have their transceivers in sleep mode to save power. The selected collar 24 retrieves GPS positions from the dog collars within Bluetooth range and sends the GPS positions to adapter 82 so that only one collar 24 drains its battery with mid or low frequency communications. Alternatively, only one GPS position is sent from the selected dog collar along with the identifiers of all collars 24 that are in Bluetooth range so that mobile telephone 14 can track each identifier as in the same proximate location. In alternative embodiments, GPS positions and collar identifiers may be relayed using mid and/or low frequency transmissions between various collars 24 and adapters 82 so that each mobile telephone 14 can track all dog collars 24. In one example situation, if a dog is on point and another dog is honoring the point, GPS position information is sent from only one dog until flush is approached by a hunter, such as at issuance of a flush alert, at which time each collar 24 sends GPS information to protect the safety of each dog. For instance, if a hunter is positioned to shoot in the direction of a dog at flush, a warning may issue to an earpiece or with a phone ring to help prevent harm to the dog: "Don't shoot Jewel located ten meters north of your current position."

Figure 9:
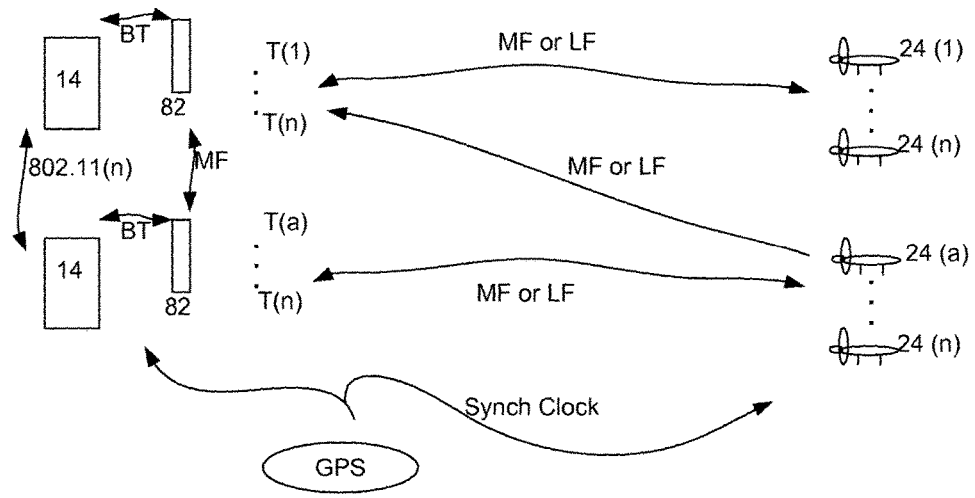
FIG. 9 depicts a variety of examples that provide improved battery life and reduced interference in hunting situations with multiple dogs and hunters.

Referring now to FIG. 9, a variety of examples are depicted that provide improved battery life and reduced radio interference in hunting situations with multiple dogs and hunters. For instance, a training application executing on a mobile telephone 14 as set forth above manages battery life and transmission interference by managing operation of adapter 82 and collar 24. Transmissions from collar 24 consume power from an internal battery so that more frequent transmissions result in shorter charge life for a given size battery. By reducing transmissions from collar 24, battery charge is conserved so that a smaller battery will support a collar for a given operating time. Further, reduced numbers of transmissions result in less bandwidth consumption so that less interference occurs in situations where multiple collars 24 and or adapters 82 are deployed. Less interference generally means that transmission attempts have a greater chance of success, thus further reducing the need for transmissions, such as repeated transmissions of the same data. To provide reduced transmissions, collar 24 and adapter 82 use logic to divide transmissions from each of plural collars 24 and adapters 82 into plural time slots. In one embodiment, a GPS clock is used as a reference point from which time slots are defined so that an internal clock on each device can precisely track its time slot for transmitting and receiving information relative to other devices. In addition, logic on collar 24 analyzes GPS position data and accelerometer data locally at collar 24 or in combination with mobile telephone 14 to limit transmissions where changes in position are relatively insubstantial. For instance, in an example embodiment, at periodic time slots, collar 24 only transmits if GPS data shows a change in position of greater than a minimum amount, such as 5M, or if a change in acceleration indicates a change in position relative to what the mobile telephone 14 monitoring collar 24 would expect over the time. Accurate position data is maintained at the mobile phone 14 by providing updates at minimum intervals, such as every minute. Accurate estimated positions are maintained at mobile phone 14 by applying accelerometer and orientation information (such as a velocity vector) provided from collar 24 (or alternatively GPS position data from collar 24 analyzed by mobile telephone 14 for change over time to estimate a velocity vector) to estimate positions with a virtual inertial navigation system (INS) between collar transmissions.

In the example embodiment depicted by FIG. 9, a first set of collars 24 labeled (1-n) is controlled by a first adapter 82 and first mobile telephone 14. A second set of collars 24 labeled (a-n) is controlled by a second adapter 82 and a second mobile telephone 14. The first and second mobile telephones 14 establish an ad hoc network with peer-to-peer communications using 802.11(n) to define time slot and frequency assignments for each adapter 82 to communicate with each set of collars 24. The first adapter 82 has a time slots t1 though tn with each time slot having an adequate length for a collar 24 to communicate GPS, accelerometer and/or other desired data. The time slots are defined relative to a GPS clock signal and tracked with an internal clock at each device, such as with a processor that controls a Bluetooth transceiver. The GPS clock signal also provides synchronization for communications between mobile telephones 14 in support of the ad hoc network. The time slots t1 through tn are sequentially defined so that adapter 82 activates its transceiver from sleep to listen across all time slots and then sleeps until the start of the next time slot period. Time slot periods may occur at regular intervals and/or at times defined relative to a GPS clock so that collars 24 know when to transmit to adapter 82. Collars 24 transmit in an assigned time slot if position updates have at least a minimum change or if a maximum time has elapsed since a previous transmission; otherwise, collars 24 keep their transceivers in a sleep mode to reduce power consumption. In one embodiment, collars 24 listen for a transmission from a collar in a previous time slot and initiate communication when the previous collar completes communication. In another embodiment, a collar 24 sleeps its transceiver 52 to reduce power consumption except during a time slot assigned to the collar. As an example each time slot t1 through tn lasts for one second with a one second idle time between each time slot until tn plus one second, then adapter 82 idles for 15 seconds from t1 based upon a GPS clock signal, after which adapter 82 awakens to repeat listening. Collar 24 remains idle up to five minutes unless a change in position or acceleration is detected, in which case a transmission is made during an assigned time slot. Adapter 82 has frequent "listening" times available to accept communication in a prompt manner when needed, such as at detection of a point, so that a collar 24 can communicate in a time slot when needed without an excessive delay. When a change in position or acceleration is detected, or five minutes has elapsed since the last collar transmission, collar 24 then transmits during a time slot assigned to it, such as based upon a reference to a GPS clock signal provided by a GPS transmission shared by a GPS receiver of collar 24 and mobile telephone 14. In one example embodiment, a collar 24 powers up its transceiver at predetermined "listen" times to receive position requests from an adapter 82. If adapter 82 requests a position update during a listening time, collar 24 responds with a position; otherwise, collar 24 saves power by avoiding unnecessary transmissions.

After the first mobile telephone 14 adapter 82 completes listening in its time slots, first adapter 82 may sleep its transceiver or, alternatively, may listen during the time slots assigned to the second adapter 82 so that first mobile telephone 14 can independently track collars 24 assigned to second mobile telephone 14 adapter 82. Similarly, second mobile telephone 14 can independently track collars 24 assigned to first mobile telephone 14. If mobile telephones 14 have too great a distance to communicate between each other with 802.11(n) or Bluetooth, then communications may take place between mobile telephones 14 through mid or low frequency transmission through adapters 82. If different frequencies are assigned to each adapter 82 for its collars 24, then an adapter 82 changes to the frequency of the other adapter 82 when listening for collars 24 in time slots managed by the other adapter 82. The overall effect of the use of time slots is that adapters 82 listen for transmissions from collars 24 at more frequent intervals than collars 24 transmit information, which may increase power consumption at adapters 82 relative to collars 24 but tends to decrease power consumption at collars 24 so that a smaller battery may be used at collar 24 to allow a smaller collar footprint than would be possible if collar 24 simply transmitted at regular intervals. Additional power savings may be achieved by adjusting the power used to transmit from collar 24. For instance, adapter 82 provides feedback to collar 24 of the signal strength received at adapter 82 and/or the distance between adapter 82 and collar 24. Collar 24 applies the feedback to adjust transmitter power settings, such as by reducing transmitter power when adapter 82 reports receiving a strong signal at a short distance or increasing transmitter power when the signal received by adapter 82 falls below a threshold.

Figure 10:
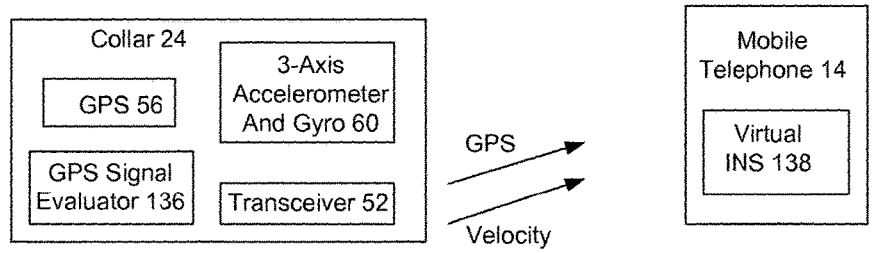
FIG. 10 depicts an example embodiment of a collar 24 that applies logic to selectively communicate position information in order to reduce the number of transmissions from collar 24 and thus save power.

Referring now to FIG. 10, an example embodiment depicts a collar 24 that applies logic to selectively communicate position information in order to reduce the number of transmissions from collar 24 and thus save power. For instance, a training application running on a mobile telephone provides logic to a collar 24 for execution on collar processor 112 to manage transmissions from collar 24 to an adapter 82. Accelerometer 60 includes gyroscopes to provide measurements of accelerations and the orientation of accelerations at collar 24, such as with a three axis MEMS-type device that has three gyroscopes aligned with three accelerometers. In one example embodiment, a lack of acceleration indicates a dog at point so that collar 24 makes less frequent position transmissions to save power since the collar's position does not change. If a lack of accelerations is replaced by new detected accelerations that indicate a point has ended, then transmissions are re-initiated to update mobile telephone 14 regarding position.

In one example embodiment, accelerometer 60 provides acceleration and orientation information to an integrator 134, which analyzes the acceleration and orientation information to determine a velocity vector at collar 24. Integrator 134 may execute as software on collar 24 or as a specialized hardware component interfaced with accelerometer 60. Integrator 134 may simplify generation of a velocity vector based upon the type of motion being tracked. For example, a running dog will have repeated pattern of motion that includes outlier accelerations when the overall running vector changes, such as with a turn or change in speed. Integrator 134 in one embodiment uses averaging of accelerations to identify outliers that allow generation of an average velocity vector for a given time period. In another example embodiment, when tracking motion of a dog or other moving animal, a constant acceleration of gravity alone indicates zero average velocity. In contrast, when tracking motion of an inanimate object, such as car, a constant acceleration of gravity alone may indicate a constant speed.

A GPS signal evaluator 136 analyzes the velocity vector (or alternatively the acceleration and orientation information itself) and GPS positions from GPS 56 to determine whether to transmit GPS or velocity vector (or raw acceleration/orientation information) information from collar 24 to adapter 82 or to maintain a sleep mode with the collar transceiver. If, for instance, a velocity vector associated with collar 24 remains relatively constant, then less frequent position transmissions are provided to mobile telephone 14 since mobile telephone 14 can apply the velocity vector to estimate collar position with relative accuracy. The velocity vector used by mobile telephone 14 to estimate position may be provided from collar 24, may be determined at mobile telephone 14 from acceleration and orientation information provided from collar 24, or may be estimated by mobile telephone 14 from GPS positions provided by collar 24 over time. If, in contrast, a velocity vector associated with collar 24 changes by a predetermined amount, then more frequent position transmissions are provided to mobile telephone 14, including updated velocity vector information. As another example, if a GPS signal becomes weak so that GPS position is unreliable, such as may happen under dense foliage, GPS signal evaluator withholds GPS position information and sends more frequent velocity vector (or alternatively acceleration and orientation information) to mobile telephone 14 so that a virtual inertial navigation system (INS) 138 executing on mobile telephone 14 can track collar position with INS logic based upon accelerometer and gyroscope orientation measurements taken at collar 24 and transmitted to mobile telephone 14, such as in the form of a velocity vector. In one embodiment, GPS signal evaluator 136 applies an end user accuracy/power preference setting to determine how often to transmit position information; a higher accuracy preference with more frequent transmissions will consume increased battery charge resulting in reduced battery life.

Figure 11:
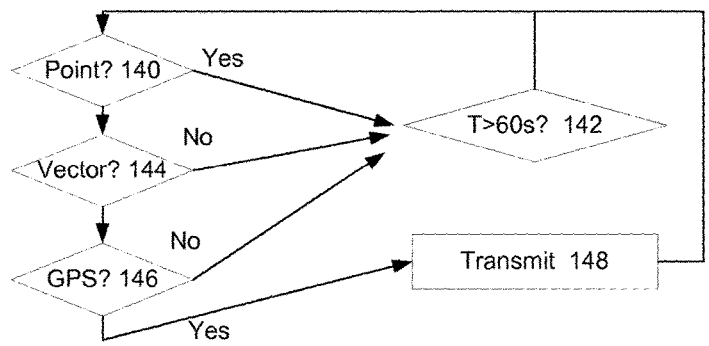
FIG. 11 depicts a flow chart of one example of logic for determining when to communicate position information from a collar.

Referring now to FIG. 11, a flow chart depicts one example of logic for determining when to communicate position information from a collar 24. The process starts at step 140 with a determination of whether the collar 24 is on point or otherwise immobile. If yes, a point alert issues upon initial determination of the point and the process continues to step 142 to determine if a minute has passed since the last transmission from collar 24. If a minute has not passed, the process returns to step 140. If a minute has passed at step 142, then a position transmission is made at step 148 and the process returns to step 140. If the point determination at step 140 is no, the process continues to step 144 to determine if a velocity vector change has occurred based upon sensed accelerations and orientations. If a velocity vector change has not occurred, the process continues to step 142 to determine the last transmission as set forth above. If a velocity vector change has occurred, the process continues to step 146 to determine if a measured GPS position has changed by greater than a predetermined amount, such as 10M. If not, the process continues to step 142 to determine whether to make a transmission as set forth above. If yes, the process continues to step 148 to make a transmission. In one example embodiment, transmissions are made during defined time slots during which adapter 82 is awake to receive the transmissions, such as every 10 seconds based upon a GPS clock reference that improves accuracy in defining the time slot. In one alternative embodiment detection of a vector change can initiate a transmission at step 148 even where GPS position has not changed beyond a minimum amount. This provides positive updates based upon activity associated with the dog that may indicate a chase or an inaccurate GPS position signal. In one alternative embodiment, position information is transmitted from collar 24 based upon a change in position of greater than a threshold amount from the last transmitted position, such as every time the collar moves 10M or greater from a last transmitted position. This updates positions when positions change and saves power by avoiding transmissions from a collar 24 when a position has not changed enough to warrant an update to a training application.

Figure 12:
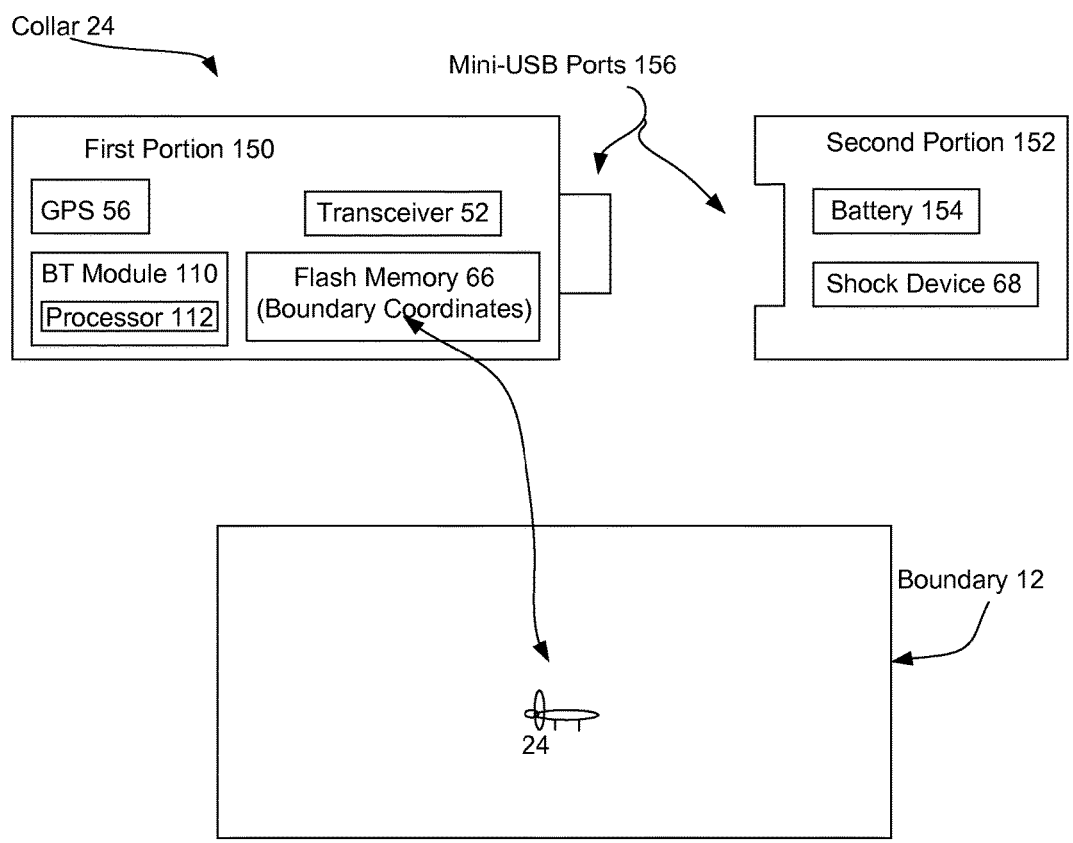
FIG. 12 depicts one example of a modular collar adapted for use with a shock device 68, such as to enforce a GPS fence boundary.

FIG. 12 depicts one example of a modular collar 24 adapted for use with a shock device 68, such as to enforce a GPS fence boundary 12. Collar 24 has a first portion 150 that contains processing components for managing position data and performing radio transmissions, and a second portion 152 for providing power with a battery 154. In the example embodiment, a shock device is included with the second portion 152, however, in alternative embodiments second portion 152 provides a removable battery 154 without a shock device that can have a smaller footprint where power is only needed for first portion 150 and not needed for a shock device 68. First portion 150 interfaces with second portion 152 with opposing mini-USB ports 156 that allow battery 154 to power first portion 152 and allow a processor of first portion 152 to control shock device 68. Using USB ports 156 for interfacing first portion 152 with second portion 154 conveniently allows logic and charging interfaces with each portion by USB devices, such as a laptop computer that charges battery 154 and accesses flash memory 66 of first portion 150. First portion 152 includes a Bluetooth module 110 and ARM processor 112 that controls Bluetooth operations. A wireless communication module 52 interfaces with processor 112 to communicate with adapter 82 using mid and/or low frequency signals as described above. An external computer interfaced through a USB port 156 of first portion 150 can store coordinates of boundary 12 for access by processor 112 so that processor 112 can issue a shock by shock device 68 if collar 24 approaches a boundary. Alternatively, Bluetooth communications from an external computer can store the boundary coordinates in flash memory 66.

Advantageously, collar 24 maintains minimal power consumption while monitoring position with GPS 56 because no transmissions are made by wireless communication module 52 as long as collar 24 remains within the GPS coordinates boundary 12 stored in flash memory 66. If collar 24 approaches a boundary 12 defined by GPS coordinates in flash memory 66, then shock device 68 issues a stimulation to motivate the dog to return to the boundary. In one embodiment, a voice command issues from collar 12, such as a whoa command stored in flash memory 66 and played at a speaker of collar 12, so that the dog stops moving. Stimulation issues at shock device 68 if the dog fails to whoa. Along with the whoa command, the processor 112 initiates communication through wireless communication module 52 to issue a warning to an end user that the dog has approached and/or breached boundary 12. If collar 24 is within extended Bluetooth range, the warning may issue with a Bluetooth or an 802.11(b, g or n) signal to a computer device or mobile telephone 14 of the end user. Alternatively, wireless communication module 52 remains powered down until a boundary 12 is approached or breached and then transmits through low or mid frequency ranges as described above to allow an end user to locate collar 24 with the GPS position received by an adapter 82 and forwarded to a mobile telephone 14 or other computing device. In one embodiment, adapter 82 stores GPS positions and acceleration information so that an end user can recall at a later time the direction taken by collar 24. In another embodiment, once a collar 24 breaches a boundary 12, a recovery signal with the GPS position is issued at regular time intervals from wireless communication module 52 of collar 24 based upon a GPS time signal or other clock to synchronize transmission of signals from collar 24 with reception of signals by adapter 82. For instance, collar 24 issues a signal at 15 second intervals on four different frequencies in sequential order each minute to ensure that interference does not impede signal transmission. Adapter 82 knows the frequency to listen to on each 15 second interval based upon a GPS clock signal available to both adapter 82 and collar 24 that ensures synchronization with an internal clock, such as a clock supported by processor 112. In an alternative embodiment, collar 24 listens at the 15 second intervals without transmitting unless a transmission is detected from adapter 82 that commands a transmission of position information from collar 24; this allows collar 24 to preserve battery charge for a longer time period. Other power savings techniques may be used at collar 24 as described above, such as only transmitting a position if the position changes by more than a threshold from the most recent position transmitted by collar 24 and received by an adapter 82, such as by sending a confirmation of position reception from adapter 82 to collar 24. In summary, collar 24 maintains a low power mode while a dog remains in boundary 12 by executing instructions on processor 112 without communication with external devices and then initiates a transceiver when a dog breaches the boundary 12 to provide a warning and position information to an adapter 82 for presentation at a mobile telephone 14 or other computing device. An end user is able to monitor a dog's position for lengthy time periods with minimal battery discharge by avoiding communications until position information is needed because the dog has left a proscribed area.

In various embodiments, various portions of the collar, adapter, training application and virtual INS may be used in different ways, alone and in combination with each other. As an example, although collar 24 is presented in the context of a dog collar, similar use is made with monitoring of children, such as by attaching a collar 24 to a child as a wrist bracelet, ankle bracelet or necklace. A parent can set parameters to issue warnings, for example, if a child leaves a park, school, shopping center, athletic event, etc. . . . A parent can monitor for sudden accelerations that might indicate an injury to a child, or a velocity vector towards a busy street, and obtain immediate oral warnings in an earpiece having a Bluetooth interface with a mobile telephone 14. For instance, a high g-force detected by an accelerometer triggers an "injury" alert for the parent similar to the point alert for a dog. Monitoring by adapter 82 provides an inexpensive alternative to tracking devices that require cell phone service. A virtual INS operating on a mobile telephone based upon acceleration and orientation information provided from a collar allows a parent to monitor a child's position during indoor activities where GPS reception is sometimes intermittent. Power savings techniques set forth above allow a collar 24 to have a small footprint that a child can wear a collar with relative comfort and minimal interference with the child's activities. Further, a speaker and microphone on the collar can provide the parent with immediate voice access and the ability to listen to the child's environment when appropriate by interfacing through adapter 82 or an ad hoc peer-to-peer communication with 802.11(b, g or n). As another example, adapter 82 interfaces with any device that receives WPAN communications, such as Bluetooth, including laptops, tablets or desktop systems. For example, a parent wearing Google Glass obtains a GPS position of a collar 24 from adapter 82 with a Bluetooth communication and can present at the glass a box over the position of the child so the parent can quickly obtain a visual of the child. Virtual INS may track inanimate objects, such as packages or items subject to theft and can issue a theft alert in the event of a sudden acceleration. Mobile telephone 14 may have adapter 82 integrated within its housing to provide a mobile telephone 14 with integrated adapter functionality. Alternatively, mobile telephone 14 may alter operation of existing hardware, such as firmware that executes 802.11(b, g or n) or Bluetooth communication, to provide communications at various tunable frequencies in the place of an adapter 82. Other alterations to the described dog collar, adapter, mobile telephone embodiment are contemplated as desired to track items as desired by an end user.

Although the present invention has been described in detail, it should be understood that various changes, substitutions and alterations can be made hereto without departing from the spirit and scope of the invention as defined by the appended claims.

What is claimed is:

1. A dog training tool comprising:
   a mobile computing device having a display and a WPAN interface;
   a collar adapted to couple to a dog, the collar having a GPS receiver and a wireless communication module operable to communicate GPS positions of the GPS receiver by a wireless radio signal;
   an adapter having a WPAN interface operable to communicate with the mobile computing device WPAN interface and a wireless communication module operable to communicate with the wireless radio signal; and
   a training application stored in memory of the mobile computing device and operable to execute on a processor of the mobile computing device, the training application operable to retrieve the GPS positions from the adapter through the WPAN interface and to present the GPS positions at a display of the mobile computing device;
   wherein the training application configures the collar to transmit GPS positions in a first manner and a second manner, the second manner automatically applied instead of the first manner based upon one or more predetermined conditions.

2. The dog training tool of claim 1 wherein the first manner comprises a wireless radio signal from the collar to the adapter and a WPAN interface from the adapter to the mobile computing device, and the second manner comprises a WPAN interface from the collar to the mobile computing device with the wireless radio signal turned off, the predetermined condition comprising detection of the collar in WPAN interface range with the mobile computing device.

3. The dog training tool of claim 2 wherein the wireless radio signal is automatically turned on if the collar leaves the range of the WPAN interface.

4. The dog training tool of claim 3 wherein WPAN comprises Bluetooth communication and the mobile computing device comprises a mobile telephone having a microphone, the training application further operable to identify gunshots detected by the microphone.

5. The dog training tool of claim 1 wherein the first manner comprises a wireless radio signal periodically sent from the collar to the adapter, and the second manner comprises a wireless radio signal sent from the collar to the adapter based upon a change in position detected at the collar.

6. The dog training tool of claim 5 further comprising an accelerometer, the change in position determined by analyzing accelerations detected by the accelerometer to determine that a predetermined change in position has occurred.

7. The dog training tool of claim 5 wherein the change in position detected at the collar comprises a first GPS position detected by the GPS receiver having a predetermined distance from a second GPS position sent by the wireless radio signal to the adapter.

8. The dog training tool of claim 7 wherein the collar sends the wireless signal in a time slot determined by reference to a clock provided by the GPS receiver.

9. A method for communicating position information from a dog collar to a mobile computing device, the method comprising:
   determining position information with a GPS receiver at the collar;
   sending the position information in a first predetermined manner with a wireless radio signal;
   detecting a predetermined condition; and
   in response to the predetermined condition, sending the position information in a second predetermined manner;
   wherein:
   detecting a predetermined condition further comprises detecting a WPAN interface available between the collar and mobile computing device; and
   in response to the predetermined condition further comprises sending the position information from the collar to the mobile computing device by the WPAN interface instead of the wireless radio signal.

10. The method of claim 9 wherein the wireless radio signal comprises a VHF radio signal, the VHF radio signal turned off when position information is sent by the WPAN interface.

11. The method of claim 10 further comprising:
   detecting loss of the WPAN interface; and
   in response to detecting loss of the WPAN interface, turning on the VHF radio signal to send the position information in the first predetermined manner.

12. The method of claim 9 wherein the first predetermined manner comprises a wireless radio signal periodically sent from the collar, and the second predetermined manner comprises a wireless radio signal sent from the collar based upon a predetermined change in position detected at the collar.

13. The method of claim 12 wherein the predetermined change in position is determined by analyzing accelerations detected by an accelerometer in the collar to determine that the position has changed by a predetermined distance from a position sent by a previous wireless radio signal, the predetermined condition comprising determination of the position change by the predetermined distance before a next periodic radio signal is due.

14. The method of claim 12 wherein the predetermined change in position is determined by comparing a first GPS position detected by the GPS receiver having a predetermined distance from a second GPS position previously sent by the wireless radio signal.

15. The method of claim 9 wherein the wireless radio signal is sent from the collar to an adapter and from the adapter to the mobile computing device, the adapter having input buttons to accept end user inputs to control the collar.

16. A tracking device comprising:
   a processor;
   a GPS receiver interfaced with the processor and operable to determine a position of the tracking device;
   a wireless communication device interfaced with the processor, the wireless communication device operable to communicate the position determined by the GPS receiver to a mobile computing device with a wireless communication signal; and
   a WPAN device interfaced with the processor, the WPAN device operable to communicate with the mobile computing device through a WPAN interface;
   wherein the processor is operable to automatically turn off the wireless communication signal in response to one or more predetermined conditions, the one or more predetermined conditions including at least a determination that the WPAN device is in range to communicate the position to the mobile computing device through the WPAN interface.

17. The tracking device of claim 16 further comprising:
   a housing, the processor, GPS receiver, wireless communication device and WPAN device disposed in the housing;
   an adapter separate from the housing, the adapter having a wireless communication device and a WPAN device, the wireless communication device disposed in the housing communicating the position to the mobile computing device by sending the wireless communication signal to the adapter wireless communication device, the adapter forwarding the position to the mobile computing device through a WPAN interface between the adapter and the mobile computing device.

18. The system of claim 16 further comprising:
   an accelerometer operable to sense accelerations;
   a gyroscope operable to sense orientations; and
   a GPS signal evaluator, the GPS signal evaluator operable to determine a predetermined condition associated with the GPS receiver and, in response to the predetermined condition, to send information associated with the accelerometer and gyroscope by the wireless communication signal.

19. The system of claim 16 wherein the wireless communication device is further operable to send the wireless communication signal at first and second transmission powers based upon a return signal strength associated with the wireless communication signal.

* * * * *